United States Patent [19]
Pike

[11] 3,894,853
[45] July 15, 1975

[54] GAS TREATING APPARATUS

[75] Inventor: Daniel E. Pike, Harrington Park, N.J.

[73] Assignee: Air Pollution Industries, Inc., Englewood, N.J.

[22] Filed: July 10, 1974

[21] Appl. No.: 486,969

[52] U.S. Cl. ............... 55/258; 55/260; 55/267; 55/342; 55/343; 261/23 R; 261/DIG. 54; 110/119; 266/15; 266/31
[51] Int. Cl.² ........................................ B01D 47/10
[58] Field of Search ............ 55/224, 226, 240, 257, 55/267, 343, 344, 417, 342, 241, 258, 260; 261/22, 23 R, 64 R, 112, 160, DIG. 54, 17; 266/31, 15; 110/119

[56] References Cited
UNITED STATES PATENTS

| | | | |
|---|---|---|---|
| 1,844,850 | 2/1932 | Harmon | 261/160 |
| 1,970,077 | 8/1934 | Collins | 55/343 |
| 2,103,521 | 12/1937 | Luly | 55/257 X |
| 2,681,799 | 6/1954 | Van Ackeren | 261/21 |
| 2,797,904 | 7/1957 | Voorheis | 261/64 R X |
| 2,935,375 | 5/1960 | Boucher | 261/DIG. 54 |
| 3,331,591 | 7/1967 | Dell'Agnese et al | 261/DIG. 54 |
| 3,631,655 | 1/1972 | Mullen | 55/344 X |
| 3,729,898 | 5/1973 | Richardson | 261/DIG. 54 X |

Primary Examiner—Frank W. Lutter
Assistant Examiner—David L. Lacey
Attorney, Agent, or Firm—Jack Schuman

[57] ABSTRACT

A gas cooling and cleaning tower is divided by an internal transverse septum into a lower gas separating and cooling compartment and an upper water separation compartment. A plurality of individual venturi scrubbers is mounted externally of the tower, each venturi scrubber being provided with gate valves at both ends thereof, the inlet ends of the venturi scrubbers communicating with the upper portion of the lower compartment and the outlet ends of the venturi scrubbers communicating with the lower portion of the upper compartment. The venturi scrubbers are operated in parallel, and may be closed individually to increase top pressure in a blast furnace upstream of the tower or to permit servicing of individual venturi scrubbers without requiring the shutting down of the tower and the blast furnace.

4 Claims, 4 Drawing Figures

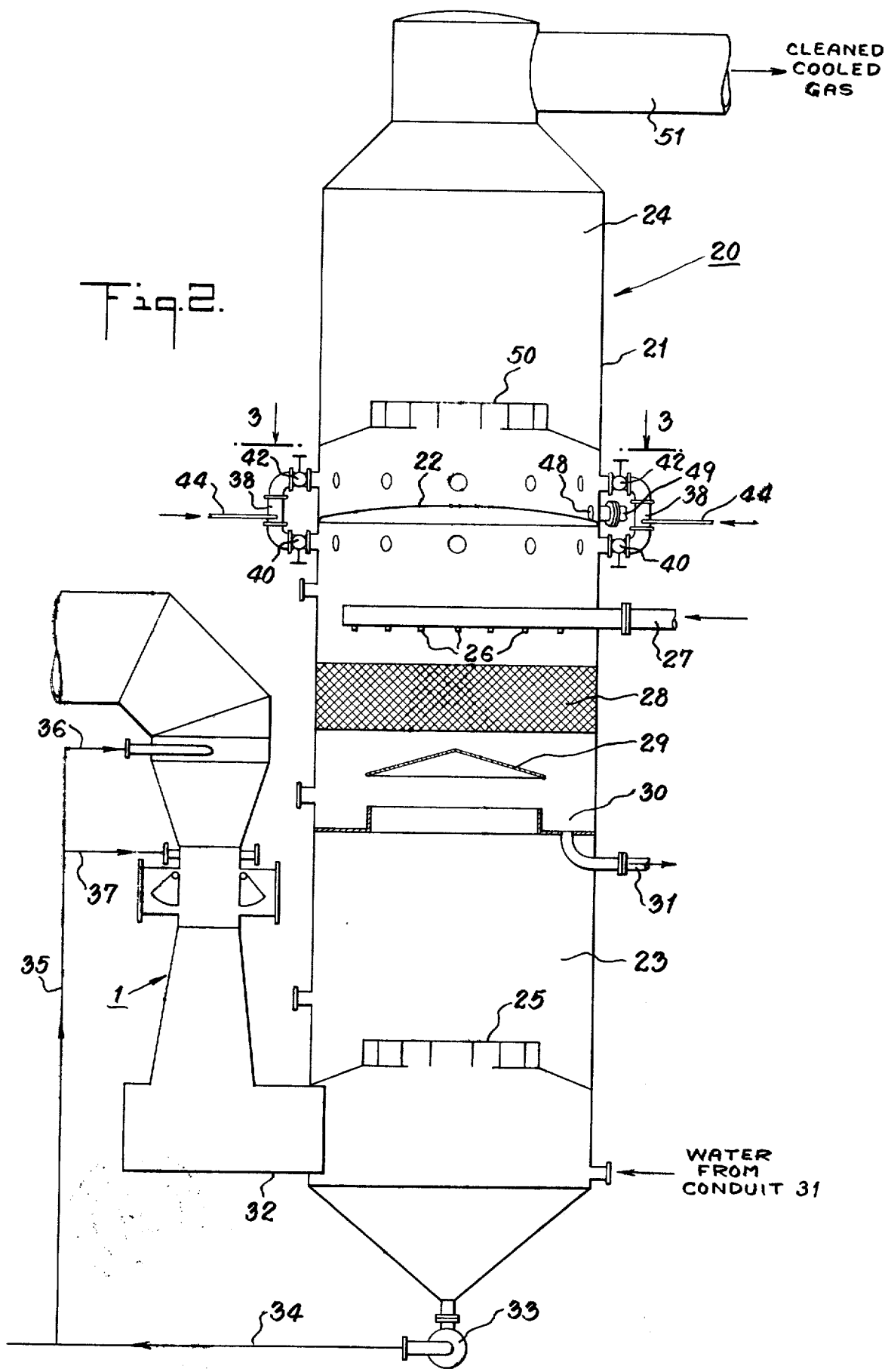

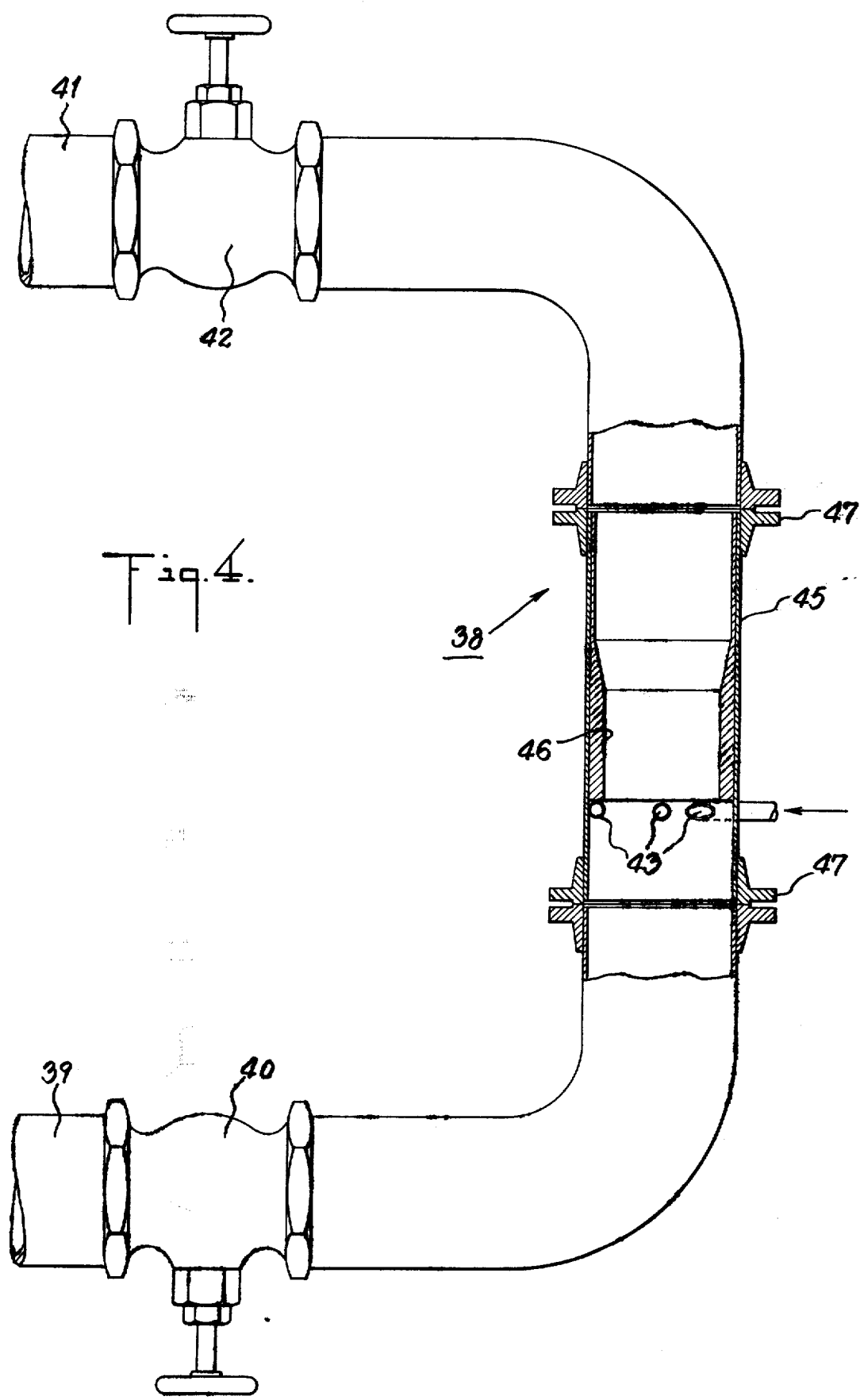

GAS TREATING APPARATUS

BACKGROUND OF THE INVENTION

1. Field of the Invention:

This invention relates broadly to gas treating apparatus. More specifically, this invention relates to gas treating apparatus which is particularly useful in conjunction with blast furnace operations and which comprises a plurality of venturi scrubbers integrated with a gas cooling and cleaning tower and which operate in parallel, which venturi scrubbers may be closed individually for servicing without necessitating the shutting down of the entire gas treating apparatus.

2. Description of the Prior Art:

Gas scrubbers based upon the venturi principle have long been known and used.

U.S. Pat. No. 2,797,904 (1957) to Voorheis shows a multiple venturi scrubber in which six individual venturi scrubbers are mounted for operation in parallel within a main casing. Valve means are provided to close off any desired number of the venturi scrubbers. It is clear from the specification that in order to disassemble for servicing any one of the individual venturi scrubbers, the entire casing must be torn down and, therefore, the multiple venturi scrubber must be shut down entirely.

U.S. Pat. No. 2,964,304 (1960) to Rice shows a gas scrubber operated in conjunction with a blast furnace. By adjusting the constrictions in the orifices of the scrubber, the blast furnace back pressure can be adjusted.

SUMMARY OF THE INVENTION

One of the objects of this invention is to provide improved gas treating apparatus.

A further object of this invention is to provide improved gas treating apparatus comprising a plurality of venturi scrubbers integrated with a gas cooling and cleaning tower and operating in parallel, which gas treating apparatus is so designed that one or more of the individual venturi scrubbers may be closed individually for servicing without necessitating the shutting down of the entire gas treating apparatus.

Still another object of this invention is to provide improved gas treating apparatus particularly useful in conjunction with blast furnace operations.

Yet other and further objects of this invention will become apparent during the course of the following description and by reference to the accompanying drawings and the appended claims.

Briefly, the foregoing objects are attained in a preferred embodiment comprising a plurality of individual venturi scrubbers integrated with a gas cooling and cleaning tower, each of the said venturi scrubbers being mounted externally of the tower and being provided with valve means on both sides of the venturi, the said plurality of venturi scrubbers being arranged for operation in parallel. In the preferred embodiment, the gas cleaning and cooling tower is provided with a transverse septum or partition dividing the tower into a lower compartment, below the septum, for gas separating and cooling, and an upper compartment, above the transverse septum, for water separation therein. The inlets of the individual venturi scrubbers communicate with the upper end of the lower compartment and the outlets of the individual venturi scrubbers communicate with the lower end of the upper compartment. The lower end of the lower compartment may communicate through several pieces of equipment (e.g., dust catcher, primary and secondary venturi scrubbers) with the top of a blast furnace. By closing off one or more individual venturi scrubbers on the tower, blast furnace back pressure can be adjusted. Moreover, when individual venturi scrubbers on the tower require servicing, they can be shut down entirely and the remaining venturi scrubbers on the tower can continue in operation, thus eliminating any need to shut down the gas treating apparatus and the blast furnace.

BRIEF DESCRIPTION OF THE DRAWINGS

Referring now to the drawings, in which like numerals represent like parts in the several views:

FIG. 2 represents diagrammatically a partially sectional view in elevation showing a gas cooling and cleaning tower with integral individual venturi scrubbers externally mounted thereto, according to the present invention, the said tower receiving gas from a secondary venturi scrubber, and a conduit communicating between the upper end of the tower and other equipment (not shown) downstream of the tower.

FIG. 4 represents an enlarged partially sectional view in elevation of one of the individual venturi scrubbers.

DESCRIPTION OF THE PREFERRED EMBODIMENT

Figure 1:
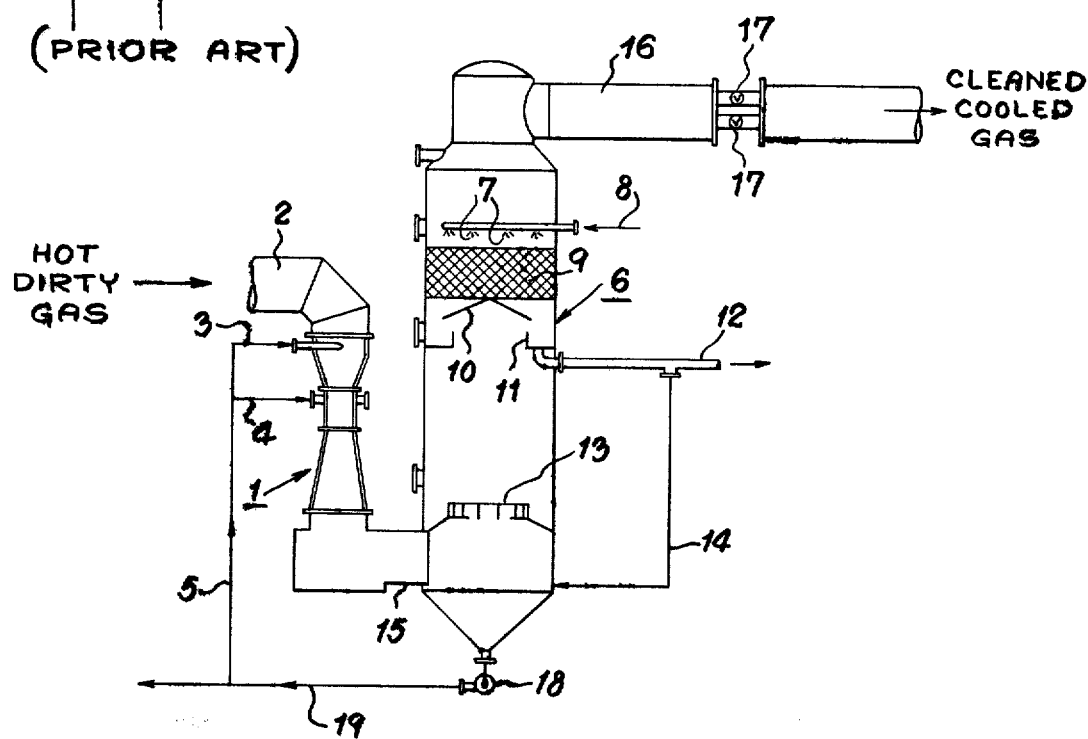
FIG. 1 represents diagrammatically a partially sectional view in elevation of prior art apparatus showing a secondary venturi scrubber which receives gas through other equipment (not shown) from a blast furnace (not shown) upstream of the said secondary venturi scrubber, the figure also showing a gas separating and cooling tower, and a plurality of butterfly-type valves, commonly called septum valves, in the conduit leading from the outlet of the gas separating and cooling tower to other equipment (not shown) downstream of the said gas separating and cooling tower.
Figure 3:
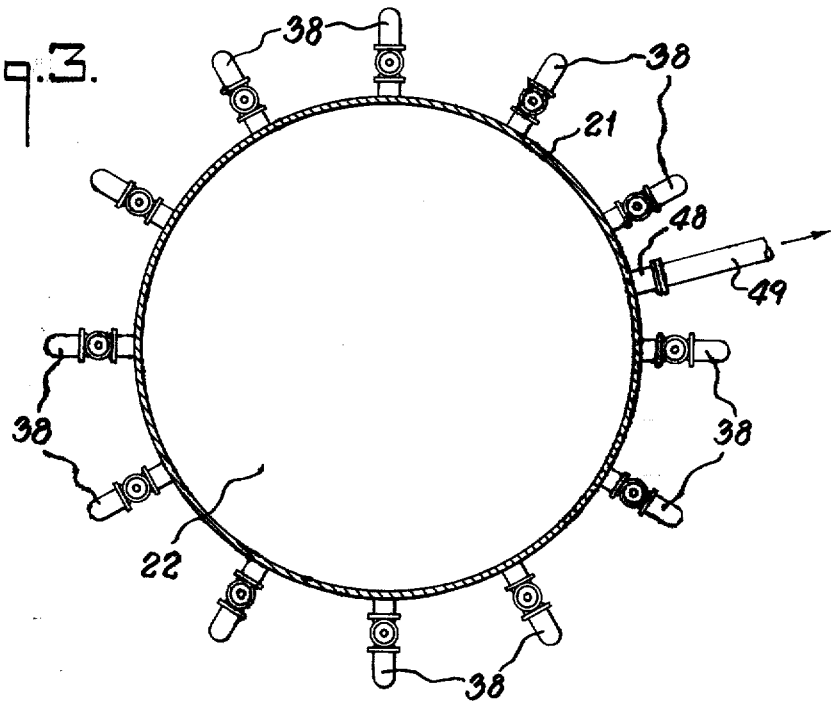
FIG. 3 represents an enlarged section taken along the line 3—3 of FIG. 2.

The present invention is better understood by referring first to a typical prior art system as shown in FIG. 1. Secondary venturi scrubber 1 receives, through conduit 2, gas from the top of a blast furnace (not shown), the said gas passing from the blast furnace to a dust catcher (not shown), thence to a primary venturi scrubber (not shown) and thence into conduit 2. Scrubbing water enters secondary venturi scrubber 1 through conduits 3 and 4 served by header 5. Gas separating and cooling tower 6 has an upper gas cooling section and a lower gas separating section, and is provided therein with cooling sprays 7 served by conduit 8 communicating with a source (not shown) of cooling water. Tower 6 is also provided with gas cooling element 9, with a conical baffle 10, with an annular trough 11 collecting water from the gas cooling element 9 flowing over baffle 10, the said trough 11 discharging the collected water to conduit 12, and with a secondary separator 13. Makeup scrubbing water is fed to the bottom of tower 6 through conduit 14, the latter communicating with conduit 12. Gas conduit 15 communicates between the discharge of secondary venturi scrubber 1 and the bottom of tower 6. Cleaned cooled gas leaves the top of tower 6 and passes through conduit 16 and through multiple butterfly-type or septum valves 17 to other equipment downstream (such as stoves and burners, not shown). Water from the bottom of tower 6 is fed by means of pump 18 through conduit 19 serving header 5.

The operation of secondary venturi scrubber 1 and tower 6 is conventional and well-known. It will suffice to say that hot dirty gas from the top of the blast furnace is cleaned and cooled after passing through the said secondary venturi scrubber 1 and the tower 6 and into conduit 16.

The butterfly-type or septum valves 17 are a source of difficulty in this conventional system. These valves 17 wear out in use, and can only be replaced by first shutting down the entire system including the blast furnace. Moreover, water is sometimes injected into the housings of the butterfly-type valves 17, and this water, entrained in the gases passing through the valves 17, may cause operating problems in the equipment served by the conduit 16 downstream of the said valves 17.

The present invention overcomes the problems and operating difficulties of the prior art system.

Referring now to FIG. 2, the gas treating apparatus 20 of the present invention is seen as comprising gas cooling and cleaning tower 21 provided therein with a transverse septum or partition 22 dividing the said tower 21 into a lower gas separating and cooling compartment 23 below the said transverse septum 22 and an upper water separator compartment 24 above the said transverse septum 22.

The lower compartment 23 of tower 21 is provided therein with a secondary separator 25, cooling sprays 26 served by conduit 27 communicating with a source (not shown) of cooling water, a gas cooling element 28, a conical baffle 29, an annular trough 30 collecting water from the gas cooling element flowing over the conical baffle 29, the said trough 30 discharging the collected water into conduit 31, and with gas conduit 32 communicating with the discharge of secondary venturi scrubber 1. Water from the bottom of lower compartment 23 of tower 21 is fed by means of pump 33 through conduit 34 serving header 35 which feeds conduits 36 and 37 of secondary venturi scrubber 1.

From the foregoing description, it will be seen that lower compartment 23 of tower 21 is essentially the same as the entire tower 6 of the prior art as shown in FIG. 1.

Arranged externally to tower 21 is a plurality of venturi scrubbers 38. Each venturi scrubber 38 has an inlet end 39 communicating through gate valve 40 with the upper portion of lower compartment 23 and an outlet end 41 communicating through gate valve 42 with the lower end of upper compartment 24. Each venturi scrubber 38 is provided with water inlets 43, some of which may be disposed radially and others tangentially to the passageway through the said venturi scrubber, as shown in greater detail in FIG. 4, the said water inlets 43 being served by a conduit 44 communicating with a source (not shown) of scrubbing water. Each venturi scrubber 38 has a venturi section 45 preferably lined with a fused alumina collar 46 and provided with flanged connections 47 between the gate valves 40 and 42 for ease of servicing and replacement.

Upper compartment 24 is provided at its lower end, just above the transverse septum, with discharge outlet 48 communicating with water discharge conduit 49 for the removal of water from the said upper compartment 24. It will be noted that transverse septum 22 is upwardly dished to provide structural rigidity against the higher pressure in lower compartment 23 and also to direct water in said upper compartment 24 to the walls thereof for more complete and efficient removal of water from the said upper compartment 24.

Upper compartment 24 is also provided, in the preferred embodiment, with a separator 50.

The top of upper compartment 24 is provided with conduit 51 conducting cleaned and cooled gases to other equipment (not shown) downstream of the said tower 21.

The operation of the present invention will now be described, it being understood that, as in the conventional system hereinbefore described and shown in FIG. 1, hot dirty gas from the top of a blast furnace is passed from the said blast furnace through a dust catcher and primary venturi scrubber and thence through the secondary venturi scrubber 1 shown in FIG. 2. This gas is cleaned and cooled after passing through the lower compartment of tower 21, which lower compartment 23 is operated in the same manner as tower 6 of the prior art system.

The gases exit the upper portion of lower compartment 23 in a plurality of parallel streams through the plurality of venturi scrubbers 38, to the water inlets 43 of which venturi scrubbers 38 scrubbing and cooling water is introduced through conduits 44. The gases, in passing through the venturi scrubbers, are further cleaned and cooled by means of the scrubbing and cooling water fed to the venturi scrubbers 38 as well as the action of the venturi constriction therein. The further cleaned and cooled gases enter the lower portion of the upper compartment 24 and then pass through separator 50 in which the scrubbing and cooling water from the venturi scrubbers 38, entrained with the gases, is removed. The cleaned and cooled gases, freed from the water from the venturi scrubbers 38, exits the top of upper compartment 24 and passes through conduit 51 to further equipment (not shown) downstream. Water removed from the gases by means of separator 50 exits the upper compartment 24 through discharge outlet 48 and passes through discharge conduit 49.

The venturi scrubbers 38 permit a further and hence more efficient overall cleaning and cooling of the blast furnace gases. Under some conditions, the cooling action of the venturi scrubbers 38 may be sufficient to permit lower compartment 23 to be constructed without the gas cooling element 28, resulting in a considerable saving of cooling water.

One or more of the venturi scrubbers 38 can be closed, by closing gate valves 40 and 42 associated therewith, to increase the top pressure of the blast furnace upstream of the equipment for various process reasons well known to those familiar with the operation of a blast furnace. Similarly, the top pressure of the blast furnace can be decreased by opening gate valves 40 and 42 of venturi scrubbers 38 which had been closed. It will be apparent that, because the venturi scrubbers 38 operate in parallel, closing of some of the venturi scrubbers 38 will not affect the continued operation of the other open venturi scrubbers 38.

When the venturi scrubbers 38 require servicing, for instance to replace the fused alumina collar 46 in a venturi section 45, each individual venturi scrubber 38 can be individually isolated by closing its gate valves 40 and 42. Then, the venturi section 45 can be removed by unbolting the flanged joints at either end thereof and replaced or repaired, without affecting the continued operation of the other venturi scrubbers 38 and thus without requiring the shutting down of the blast furnace.

I claim:

1. Apparatus to control top pressure in a blast furnace and to clean and cool gases emanating therefrom, said apparatus comprising:
   a. a vessel having a lower first end and an upper second end,
   b. a partition mounted within the vessel between the first and second ends thereof, said partition dividing the vessel into a lower first compartment between the partition and the lower first end of the vessel and an upper second compartment between the partition and the upper second end of the vessel,
   c. first conduit means for receiving gas emanating from a blast furnace and communicating with that end of the lower first compartment adjacent the lower first end of the vessel and adapted to introduce therein said gas,
   d. a plurality of venturi scrubbers mounted externally of the vessel, the inlet ends of the venturi scrubbers communicating with the upper portion of the lower first compartment adjacent said partition and adapted to receive gas from said lower first compartment, the outlet ends of the venturi scrubbers communicating with the lower end of the upper second compartment adjacent said partition,
   e. means adapted to introduce water into said venturi scrubbers,
   f. the outlet ends of said venturi scrubbers being adapted to discharge gas and water into said upper second compartment,
   g. water separator means mounted within said upper second compartment and adapted to separate water and gas therein,
   h. water outlet conduit means communicating with the lower end of said upper second compartment adjacent said partition and adapted to remove water from said upper second compartment,
   i. a plurality of valve means mounted externally of the vessel, each of said valve means being operatively associated with one of said venturi scrubbers, each of said valve means being adapted to close or selectively to open its respective venturi scrubber independently of the other venturi scrubbers whereby to control top pressure in said blast furnace,
   j. second conduit means communicating with that end of said upper second compartment adjacent the upper second end of the vessel and adapted to remove therefrom cleaned and cooled gas.

2. Apparatus as in claim 1, wherein:
   k. said partition is horizontally disposed within said vessel and is dished upwardly,
   l. said water outlet conduit means communicates with the upper second compartment between the elevation of the periphery of the partition and the elevation of the topmost point of the dished partition.

3. Apparatus as in claim 1, wherein:
   k. each venturi scrubber comprises a removable venturi section having a first end and a second end,
   l. the valve means associated with each venturi scrubber comprises a first gate valve adjacent the first end of said venturi section and a second gate valve adjacent the second end of said venturi section.

4. Apparatus as in claim 1, further comprising:
   k. gas treatment means mounted within said lower first compartment.

* * * * *